United States Patent [19]

Jorgensen

[11] 4,353,670
[45] Oct. 12, 1982

[54] MACHINING TOOL

[75] Inventor: Charles A. Jorgensen, Antioch, Ill.

[73] Assignee: Everede Tool Company, Chicago, Ill.

[21] Appl. No.: 155,103

[22] Filed: Jun. 2, 1980

[51] Int. Cl.³ .............................................. B23B 51/10
[52] U.S. Cl. .................................... 408/193; 408/201; 408/713
[58] Field of Search ............... 408/189, 200, 201, 713, 408/225, 193, 231, 224; 407/104

[56] References Cited

U.S. PATENT DOCUMENTS

| | | | |
|---|---|---|---|
| 2,162,284 | 6/1939 | Saxer | 408/200 X |
| 2,428,099 | 9/1947 | Smith | 408/201 |
| 2,437,364 | 3/1948 | Smith | 408/189 |
| 2,443,257 | 6/1948 | Leo | 408/200 |
| 2,891,429 | 6/1959 | Tragge | 408/193 X |
| 2,927,614 | 3/1960 | Ransom | 408/193 X |
| 3,228,267 | 1/1966 | Hebert | 408/193 X |
| 3,343,431 | 9/1967 | Boyer | 407/104 X |
| 3,794,438 | 2/1974 | Knutsson | 408/193 X |
| 4,197,042 | 4/1980 | Krhounek | 408/200 |

FOREIGN PATENT DOCUMENTS

| | | | |
|---|---|---|---|
| 2533937 | 10/1976 | Fed. Rep. of Germany | 408/201 |
| 498491 | 1/1920 | France | 408/200 |
| 543632 | 3/1942 | United Kingdom | 408/200 |
| 2018644 | 10/1979 | United Kingdom | 408/201 |

Primary Examiner—William R. Briggs
Attorney, Agent, or Firm—Robert E. Wagner; Ralph R. Rath

[57] ABSTRACT

A machining tool comprising a rotatable holder, a removable, axially adjustable leading element, such as a drill bit, mounted in the holder and a throw-away cutting insert mounted in a fixed, unadjustable position on the holder to fix the position of the cutting edge on the insert axially in relation to the leading element and the holder.

16 Claims, 11 Drawing Figures

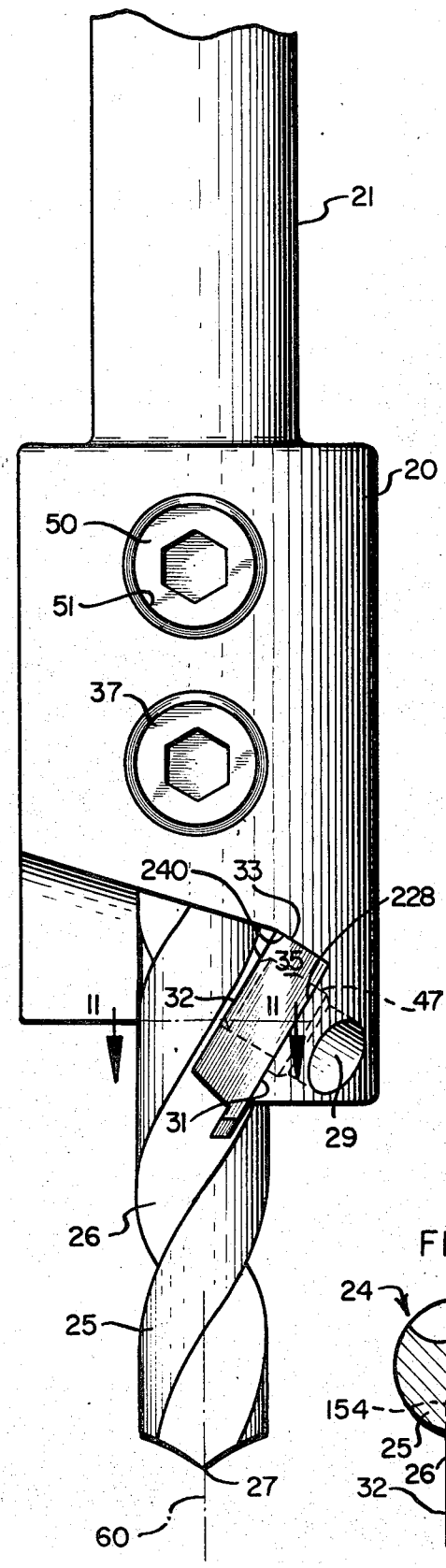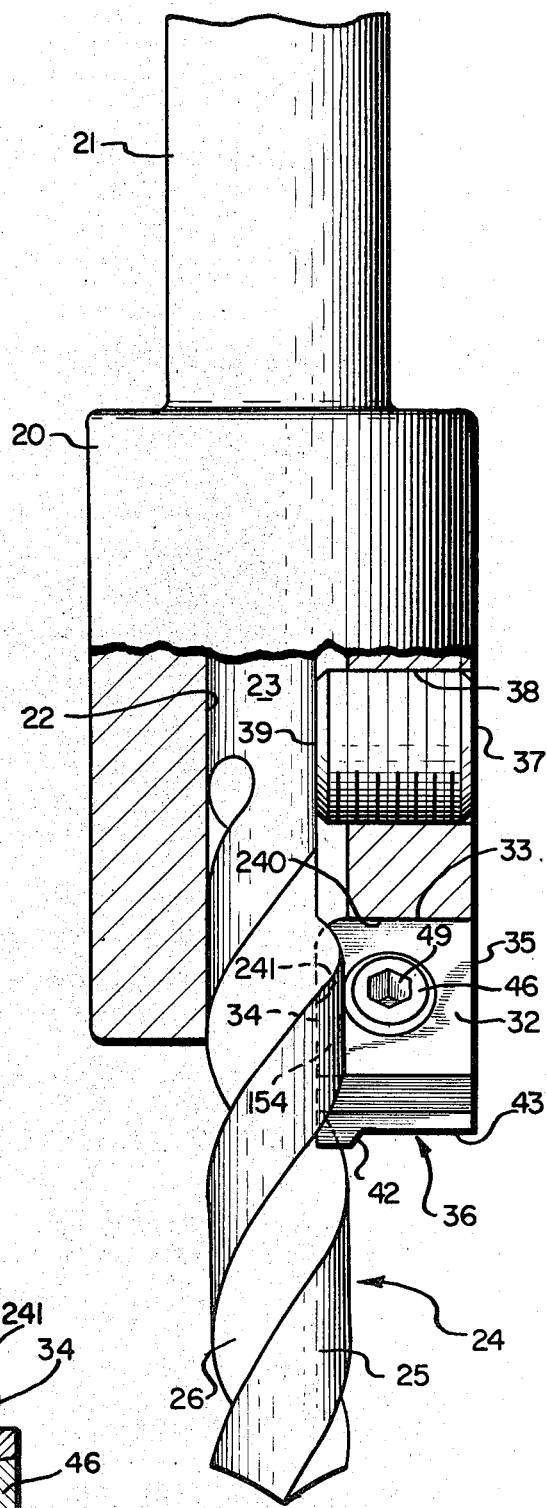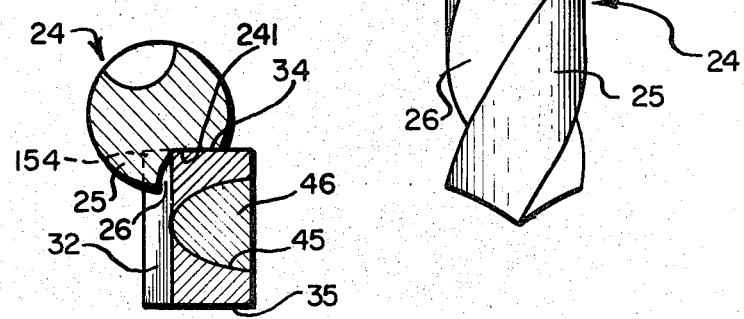

MACHINING TOOL

BACKGROUND OF THE INVENTION

The present invention relates generally to machining tools and more particularly to a machining tool which performs two or more machining functions, such as drilling and countersinking or to machining tools with removable pilots.

Drilling tools are commonly used to drill a hole in an object for receiving a fastening element, such as a bolt, to secure another part to the object in which the hole was drilled. It is oftentimes desirable to countersink the top of the hole or to spot face the flat surface area around the top of the hole to effect a close mating relation between the object in which the hole is drilled and the mating part bolted to said object. It is also desirable to combine the drilling function in one continuous operation with the countersinking function or spot facing function or both. To accomplish this combined operation, a combined drilling and cutting tool is used. This tool comprises a drill bit mounted on a rotatable holder on which a cutting element of some type is mounted or permanently attached in predetermined relation to the drill bit. The cutting element may perform the countersinking or spot facing functions or both.

There are some applications in which the cutting edge of the cutting element must be maintained a fixed, predetermined distance from the tip of the drill bit. This is to assure that the function performed by the cutting edge of the insert occurs on a surface spaced the correct distance from the bottom of the hole drilled by the drill bit. If the cutting edge were not maintained a fixed, predetermined distance from the tip of the drill bit, the object undergoing machining by the combined tool would be incorrectly machined. If the distance were too short, the hole would not be drilled to the proper depth when the countersinking or spot facing operations were completed. On the other hand, if the distance were too long, then, when the hole was drilled to the proper depth, the countersinking or spot facing operations would not be completed, and, in order to do so, the hole would have to be drilled to a greater depth than desired.

There are other applications in which the cutting edge need not be maintained a fixed, predetermined distance from the tip of a drill bit (e.g., when the hole is drilled all the way through the object being machined), but even in these applications, the cutting edge must be maintained in a fixed, predetermined axial position in relation to other parts of the machining tool or to some surface on the object being machined, or both.

In conventional machining tools in which both drilling and cutting operations are combined, the cutting element is usually of a relatively permanent nature, and, when the cutting edge thereon becomes dull, the element is removed to sharpen the cutting edge, when the cutting element is a removable insert. When the cutting element is permanently attached to a larger assembly, the entire assembly must be removed from the rest of the machining tool to sharpen the cutting element. After the cutting edge has been resharpened, the insert is replaced on the tool or the assembly to which the cutting element is permanently attached is replaced, and the cutting edge must then be correctly repositioned in relation to the drill tip or other portion of the holder or the workpiece. Because the dimensions of the cutting element are different than they were before the cutting edge was resharpened, due to the removal of material at the cutting edge in order to resharpen it, the job of correctly repositioning the cutting edge in relation to the drilling tip or the like is a difficult, time-consuming and tedious operation. In addition, time and effort are spent in the resharpening operation for the cutting edge.

SUMMARY OF THE INVENTION

In accordance with the present invention, there is provided a machining tool having a removable cutting insert and in which, once the distance between the cutting edge on the insert and the tip of the drill bit or other part has been initially fixed, it is fixed for all inserts, and the correct repositioning occurs automatically. The insert is of a relatively cheap, throw-away type which is not readily resharpenable so that, once the cutting edge thereon has been dulled, the insert has to be removed and thrown away; and it is replaced by an identical throw-away insert which can be readily assembled with its cutting edge at the same distance from the tip of the drill bit or other part as was the cutting edge of the insert being replaced. This is because, not only do the replaced and replacing inserts have identical dimensions, but, also, the inserts can be mounted on the holder in only one fixed position. In other words, the position of the insert on the tool cannot be adjusted so as to change the distance between the cutting edge and the tip of the drill bit or other part. This eliminates the tedious, time-consuming operation involved in trying to reposition the cutting edge of the replacement insert the correct distance from the drill tip, etc. Also eliminated is the expense and time consumed in resharpening the cutting edge on the insert.

In those instances where a worn drill bit is sharpened, thus changing the axial dimension thereof, and a predetermined distance between the tip of the drill bit and the cutting edge must be maintained, the drill bit is axially adjusted to regain the desired relationship after the sharpened drill bit has been replaced on the tool.

In addition to being used with removable drills including tap drills, the cutting insert may be used with removable reamers, end mills and pilots, all in accordance with the present invention.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 9 is a front view, partially in section, of a third embodiment of a combined drilling and cutting tool in accordance with the present invention;

FIG. 10 is a side view of the embodiment of FIG. 9, and;

FIG. 11 is a fragmentary sectional view taken along line 11—11 in FIG. 10.

DETAILED DESCRIPTION

Figure 1:
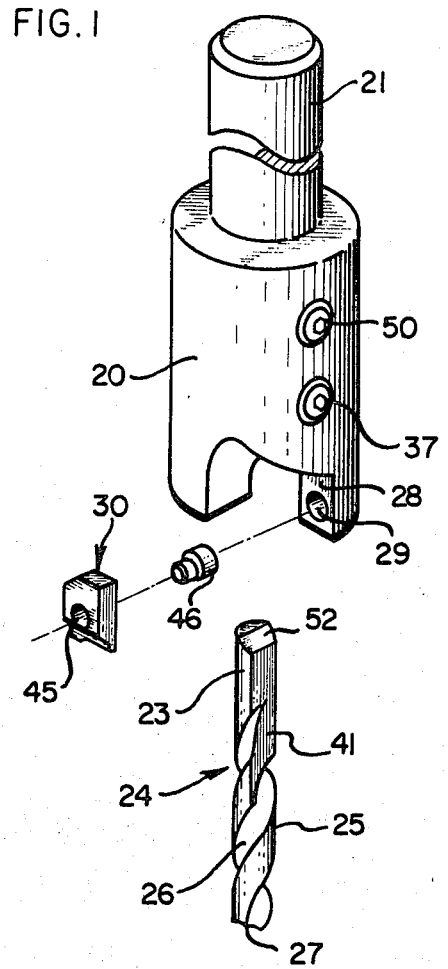
FIG. 1 is an exploded perspective of one embodiment of a combined drilling and cutting tool in accordance with the present invention.
Figure 3:
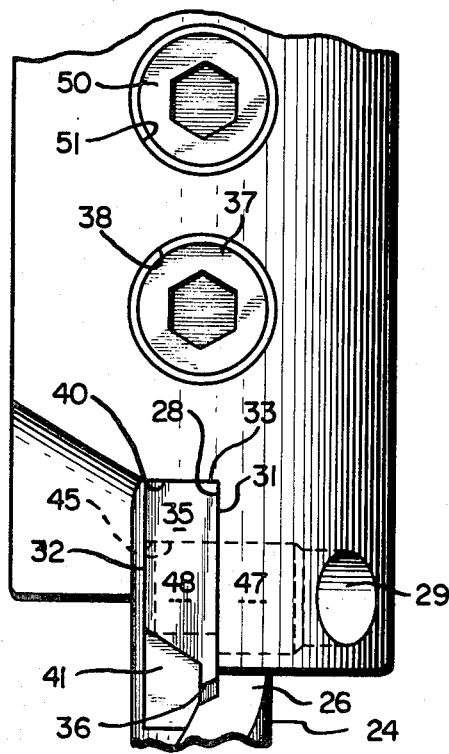
FIG. 3 is a fragmentary side view of the embodiment of FIG. 1.

Referring initially to FIGS. 1-4, there is illustrated an embodiment of a machining tool comprising a rotatable holder 20 upwardly from which extends a shank 21 for attachment to driving means for rotating the tool. Extending along the axis of holder 20 is an elongated hole 22 for receiving the shank 23 of a removable leading element, in this embodiment a drill bit 24 having a head or drilling portion 25 including a helical recess 26 and terminating at a tip 27. The removable leading element may also comprise a reamer, an end mill or a removable pilot, for example.

The reception of shank 23 in hole 22 mounts drill bit 24 for rotation about its axis and for axial adjustment in relation to holder 20.

Holder 20 comprises a seating surface 28 through which extends an opening 29. Mounted on seating surface 28 is a cutting insert 30 having inside and outside surfaces 31, 32 respectively and a plurality of peripheral sides 33-36.

Holder 20 includes a flat first locating surface 40, adjacent seating surface 28, for engaging flat peripheral side 33 of insert 30. Drill 24 comprises a flat second locating surface 41 for engaging flat peripheral side 34 of insert 30. Peripheral sides 33, 34 of insert 30 are angularly disposed to each other, and, when drill bit 24 is properly assembled on holder 20, locating surfaces 40, 41 are angularly disposed to each other in the same angular relation as are peripheral sides 33, 34 of the insert.

Figure 2:
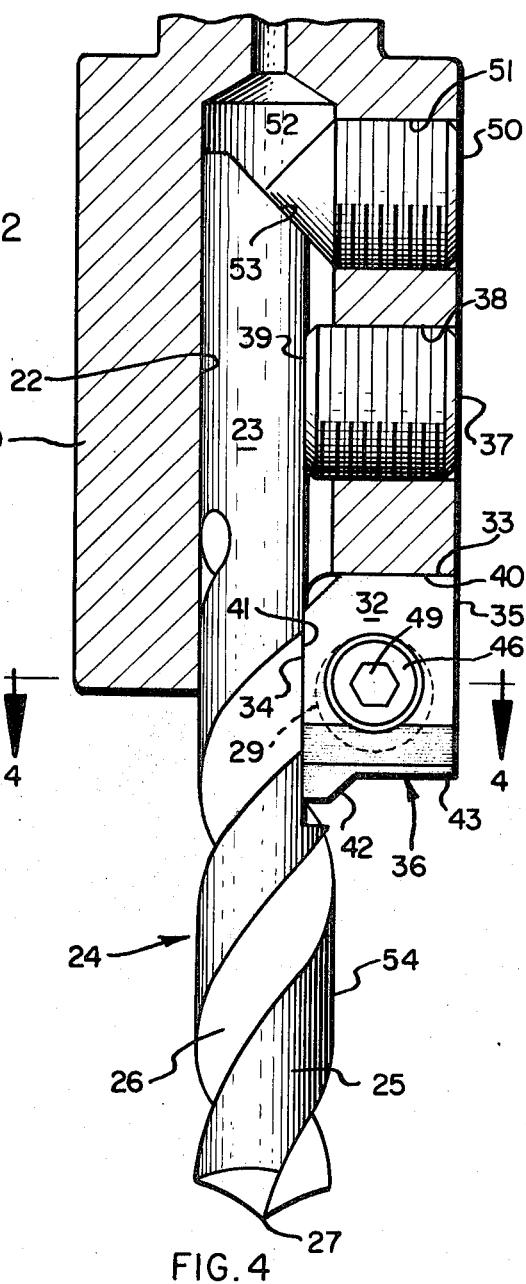
FIG. 2 is an enlarged front sectional view of the embodiment of FIG. 1.
Figure 4:
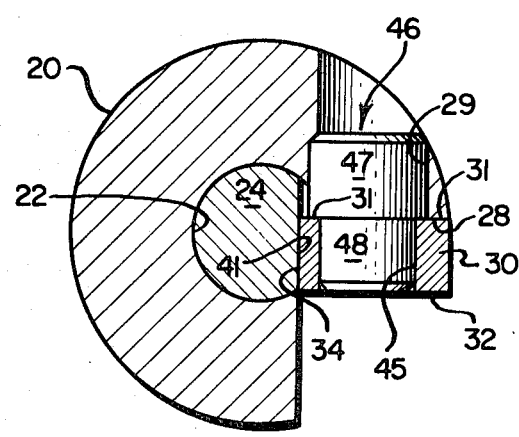
FIG. 4 is a sectional view taken along line 4—4 in FIG. 2.
Figure 5:
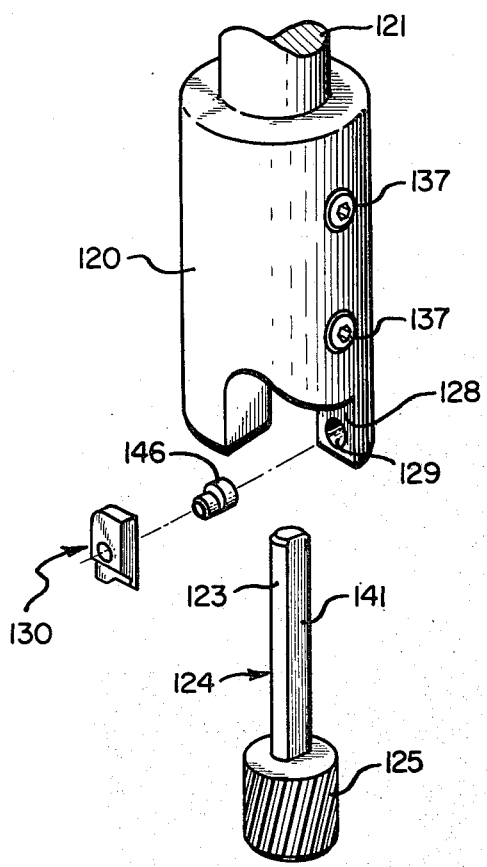
FIG. 5 is an exploded perspective of another embodiment of a combined drilling and cutting tool in accordance with the present invention.
Figure 6:
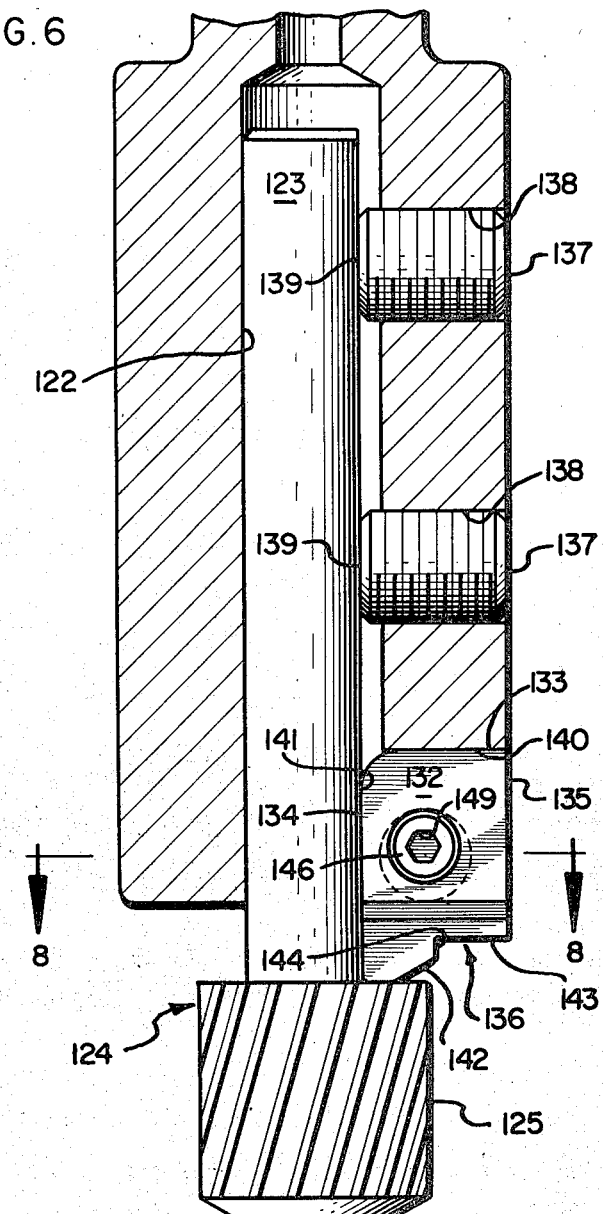
FIG. 6 is a front sectional view of the embodiment of FIG. 5.
Figure 7:
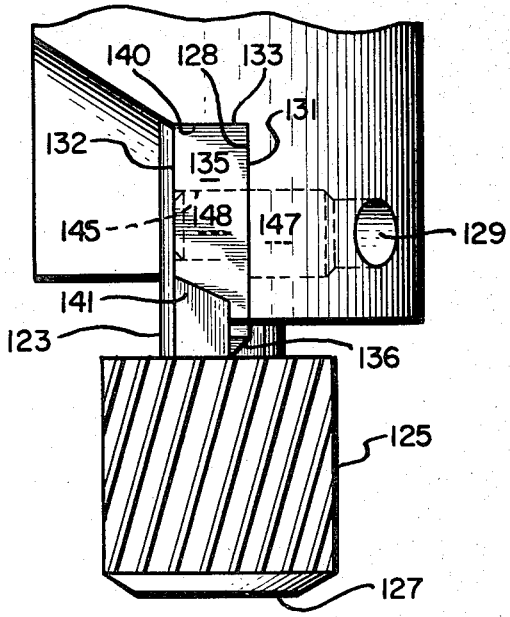
FIG. 7 is a fragmentary side view of the embodiment of FIG. 5.
Figure 8:
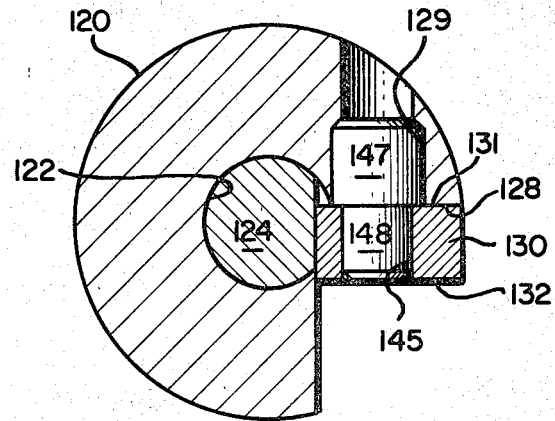
FIG. 8 is a sectional view taken along line 8—8 in FIG. 6.

Removable drill bit 24 is held in place on holder 20, in predetermined, axial and rotative positions relative to holder 20, by a set screw 37 extending through a threaded opening 38 in holder 20. The tip 39 of set screw 37 engages against an extension of flat locating surface 41 on drill bit 24 to secure the removable drill bit to holder 20. As shown in FIG. 2, locating surface 41 on drill bit 24 is remote from tip 27 of the drill bit and is recessed in relation to the periphery 54 of drilling portion 25. When the drill bit is in its predetermined rotative position, locating surface 41 is positioned to engage the insert's second peripheral side 34.

As is also shown in FIG. 2, the insert's third peripheral side 36 is opposite the insert's first peripheral side 33 and extends angularly to the insert's second peripheral side 34. Located along third peripheral side 36 is a cutting edge comprising a countersinking edge portion 42 and a spot facing edge portion 43.

Extending through insert 30, from its outside surface 32 to its inside surface 31 is an opening 45 which normally overlies opening 29 on seating surface 28 of holder 20. Insert 30 is mounted on seating surface 28, with a cam pin 46 comprising a first portion 47 normally received in opening 29 of holder 20 and a second portion 48 axially offset from first cam portion 47 and normally received in opening 45 of insert 30.

Openings 45 and 29 comprise means mounting cam pin 46 for rotation between a locking position, in which insert 30 is fixed against movement relative to holder 20 and drill bit 24, and an unlocking position in which cam pin 46 and insert 30 are removable from holder 20. As cam pin 46 is rotated from its unlocking to its locking position, the outside surface of the cam pin's second portion 48 engages the inside surface of opening 45 in insert 30 to urge insert peripheral surface 33 toward engagement with locating surface 40 on holder 20 and to urge insert peripheral surface 34 toward engagement with locating surface 41 on drill bit 24. Cam pin 46 is rotated between its locking and unlocking positions by inserting a tool, such as an allen-head wrench, inside an appropriate opening 49 in second portion 48 of the cam pin (FIG. 2).

When insert 30 is mounted in a fixed position on holder 30, the cutting edge portions 42, 43 on the insert extend in a radial direction beyond the periphery 54 of drilling portion 25 (FIG. 2).

Cam pin 46, openings 45 and 29 and first locating surface 40 comprise means for fixing the position of cutting edge portions 42, 43 axially in relation to drilling tip 27 and for preventing adjustment in an axial direction of the fixed position of the cutting edge portions 42, 43.

The distance between cutting edge portions 42, 43 and drill tip 27 is predetermined in accordance with the desired dimensions of the object to be machined by the tool, and is initially set by adjusting a jack screw 50 extending through a threaded opening 51 in holder 20 and having a conical tip 53 engaging an inclined surface 52 at an end of drill bit 24 opposite its tip 27. Adjusting jack screw 50 inwardly on holder 20 causes drill bit 24 to be pushed axially outwardly (downwardly in FIG. 2), and adjusting jack screw 50 outwardly on holder 20 allows the drill bit to be pushed axially inwardly (upwardly in FIG. 2).

Once jack screw 50 has been adjusted to obtain a desired setting for the distance between drill tip 27 and cutting edge portions 42, 43, set screw 37 is tightened to secure drill bit 24 in place within holder 20. Then, whenever the cutting edge portions 42, 43 on an insert become dulled, it is only necessary to remove the disposable insert 30, replace it with another, identical disposable insert 30, and lock the insert into place by turning cam pin 46. When the replacement insert 30 is thus locked into place, the distance between its cutting edge portions 42, 43 and drill tip 27 is the same as the distance which existed when the replaced insert 30 was previously in place.

In those instances where a dull drill bit has been sharpened, thereby changing its axial dimension, the correct distance between tip 27 and cutting edge portions 42, 43 is regained by axially adjusting the drill bit with jack screw 50. Adjustment of the axial relationship between the cutting edge portions and the removable leading element is necessary only when the removable leading element is replaced or reassembled after removal. Axial adjustment is never necessary when the cutting insert is replaced or reassembled.

As previously noted, peripheral side 34 on insert 30 engages against locating surface 41 on drill 24, to assist in fixing insert 30 in its proper position on the holder. In order for this engagement to take place, drill bit 24 must be rotated about its axis so that locating surface 41 is aligned to engage peripheral side 34 on the insert. Drill bit 24 is rotatively mounted in hole 22 of holder 20, and the rotative position of the drill bit which permits the engagement of locating surface 41 with insert peripheral side 34 also determines the correct engagement of conical tip 53 of jack screw 50 with inclined surface 52 at the inner end of the drill bit.

More particularly, when the drill bit has been rotated so that flat locating surface 41 is parallel to flat peripheral side 34 on the insert (the desired position), the engagement between conical tip 53 on jack screw 50 and inclined surface 52 of drill bit 24 occurs along a line, as distinguished from a point engagement which would occur if drill bit 24 were rotated to some position other than that in which flat locating surface 41 was parallel with flat peripheral side 34.

Referring now to FIGS. 5-8, illustrated therein is a second embodiment of the present invention constituting a combined reamer and cutting tool comprising a holder 120 upwardly from which extends a shank 121 for attachment to a driving means. Holder 120 further comprises an axial hole 122 which receives the shank 123 of a bit indicated generally at 124 and comprising a reaming portion 125 terminating at a tip 127.

Holder 120 further comprises a seating surface 128, through which extends an opening 129. Mounted on seating surface 128 is an insert 130 having inside and outside surfaces 131, 132, respectively and a plurality of peripheral sides 133-136. Bit 124 is held in place in holder 120 by a pair of set screws 137, 137 each extending through a respective threaded opening 138 in holder 120 and having a tip 139 which engages against a flat surface 141 on shank 123 of bit 124.

Holder 120 comprises a first locating surface 140 for engaging peripheral side 133 of insert 132. Bit 124 comprises a flat locating surface constituting part of flat surface 141 on shank 123, and locating surface 141 engages peripheral side 134 of insert 132.

Insert 132 additionally comprises, at peripheral side 136, a plurality of machining or cutting edge portions comprising a countersinking edge portion 142, a spot facing edge portion 143 and a counter-boring edge portion 144 located between countersinking edge portion 142 and spot facing edge portion 143. Different inserts, other than those exemplified by embodiments 32 and 132 may be used in accordance with the present invention, so long as the entire machining tool comprising such inserts is otherwise in accordance with the present invention.

Referring again to insert 132, extending through this insert is an opening 145 for receiving a portion 148 of a cam pin 146 having another portion 147 received within opening 129 of holder 120. Cam pin 146 comprises an opening 149 in cam portion 148 for receiving a tool, such as an allen-head wrench, to be used in turning the cam pin.

In some embodiments, the cam pin may be reversed with portion 148 (or 48) received in an appropriately sized opening in the holder and portion 147 (or 47) received in an appropriately sized opening in the insert. Both cam portions 147, 148 (or 47, 48) may have the same diameter so long as they are mutually axially offset or either one may have a larger diameter than the other.

Unless otherwise indicated above, the structural features of the tool illustrated in FIGS. 5-8 are essentially identical to those of the tool illustrated in FIGS. 1-4.

The embodiment of tool illustrated in FIGS. 9-11 is essentially the same as the embodiment illustrated in FIGS. 1-4, except for those features discussed below.

More particularly, as noted above, the drilling portion 25 of drill bit 24 comprises a recessed helical part 26. In the embodiment of FIGS. 9-11, that part 154 of insert 30 adjacent drilling portion 25 is received within recessed helical part 26, and, to facilitate or permit reception of insert part 154 within recessed helical part 26, the seating surface 228 on holder 20 is inclined to the axis 60 of the tool at a predetermined angle. This angle is preferably the angle of the helix of helical part 26 (see FIG. 10). However, these two angles need not be the same so long as the angle of seating surface 228 is sufficient to permit reception of insert part 154 within the recessed helical part.

In this embodiment, the insert's second peripheral side 34 engages against a second locating surface 241 ground into the recessed helix 26, and the insert's first peripheral side 33 engages an inclined first locating surface 240 on holder 20. In those situations where a second locating surface cannot be readily provided within the recessed helical part, both locating surfaces may be provided on the holder, at right angles to each other forming an inverted V, for example.

The foregoing detailed description has been given for clearness of understanding only, and no unnecessary limitations should be understood therefrom as modifications will be obvious to those skilled in the art.

I claim:
1. A machining tool comprising:
a holder;
an axially adjustable, leading element having a shank and a head portion terminating at a tip;
a hole in said holder, extending along the axis of said holder, and comprising means for receiving the shank of said leading element and for mounting said leading element in axially adjustable relation to said holder;
said hole in the holder comprising means mounting said leading element for rotation about its axis;
a cutting insert having inside and outside surfaces and a plurality of peripheral sides;
a seating surface on said holder for mounting thereon the inside surface of said insert;
a first locating surface on said holder for engaging a first peripheral side of said insert;
a second locating surface on said axially adjustable leading element for engaging a second peripheral side of the insert;
said first and second peripheral sides of the insert being angularly disposed to each other;
said first and second locating surfaces being angularly disposed to each other in the same angular relation as the first and second peripheral sides of said insert;
means for fixing said leading element in a predetermined axial position relative to the holder;
means for fixing said leading element in a predetermined rotative position in which said second locating surface is positioned to engage the second peripheral side of the insert;
a cutting edge along a third peripheral side of said insert, said third peripheral side being opposite said first peripheral side and extending angularly to said second peripheral side;
an opening extending into said holder from said seating surface thereon;
an opening extending through said insert from its outside to its inside surface and overlying said opening in the seating surface on said holder;
a cam pin extending through said opening in the insert and into said opening in the holder;
means in said openings mounting said cam pin for rotation between a locking position, in which said insert is fixed against movement relative to said holder and said leading element, and an unlocking position in which said cam pin and said insert are removable from said holder;

and means on said cam pin for urging the insert's first peripheral surface toward engagement with said first locating surface and for urging the insert's second peripheral surface toward engagement with said second locating surface, in response to rotation of said cam pin to a locking position;

said cutting edge on the insert extending radially beyond the periphery of said head portion of the leading element when the insert is mounted on the holder;

said cam pin, said openings and said first locating surface comprising means for fixing the position of said cutting edge axially in relation to said holder, and for preventing adjustment in an axial direction of the fixed position of said cutting edge.

2. A tool as recited in claim 1 wherein:
said second locating surface is remote from the tip of said leading element and is recessed in relation to the periphery of said head portion.

3. A tool as recited in claim 1 wherein:
said second locating surface comprises means for engaging said second peripheral side of the insert at all operative positions of axial adjustment of said axially adjustable leading element.

4. A tool as recited in claim 1 wherein:
said cutting edge comprises a countersinking portion.

5. A tool as recited in claim 1 wherein:
said cutting edge comprises a spot facing portion.

6. A tool as recited in claim 5 wherein:
said cutting edge comprises a countersinking portion located between said spot facing portion and the head portion of the leading element.

7. A tool as recited in claim 1 wherein:
said cam pin, said openings and said first locating surface comprise means for fixing the position of said cutting edge axially in relation to said tip of said leading element.

8. A tool as recited in claim 1 wherein:
said leading element is a machining element and the head portion thereof is a machining portion.

9. A tool as recited in claim 1 wherein:
said leading element is a drill bit;
said head portion of the leading element comprises a recessed helical part;
a part of said insert adjacent said head portion is received within said recessed helical part;
and said seating surface is inclined at a predetermined angle to the axis of said holder to permit the reception of said insert part within said recessed helical part.

10. A tool as recited in claim 9 wherein:
said predetermined angle of inclination of said seating surface corresponds to the angle of the helix of said helical part.

11. A tool as recited in claim 9 wherein:
said second locating surface is in said recessed helical part.

12. A machining tool comprising:
a holder;
an axially adjustable, drill bit having a shank and a drilling portion terminating at a tip;
said drilling portion comprising a recessed helical part;
a hole in said holder, extending along the axis of said holder, and comprising means for receiving the shank of said drill bit and for mounting said drill bit in axially adjustable relation to said holder;
a cutting insert having inside and outside surfaces and a plurality of peripheral sides;
a seating surface on said holder for mounting thereon the inside surface of said insert;
a first locating surface on said holder for engaging a first peripheral side of said insert;
a second locating surface on said drill bit for engaging a second peripheral side of the insert;
said first and second peripheral sides of the insert being angularly disposed to each other;
said first and second locating surfaces being angularly disposed to each other in the same angular relation as the first and second peripheral sides of said insert;
means for fixing said drill bit in a predetermined axial position relative to the holder;
a cutting edge along a third peripheral side of said insert, said third peripheral side being opposite said first peripheral side and extending angularly to said second peripheral side;
and means for locking said insert in an operative position on said holder;
said cutting edge on the insert extending radially beyond the periphery of said drilling portion when the insert is mounted on the holder;
means comprising said locking means and said first locating surface for fixing the position of said cutting edge axially in relation to said holder and for preventing adjustment in an axial direction of the fixed position of said cutting edge;
a part of said insert adjacent said drilling portion being received within said recessed helical part;
said seating surface on said holder being inclined at a predetermined angle to the axis of said holder to permit the reception of said insert part within said recessed helical part.

13. A tool as recited in claim 12 wherein:
said second locating surface is in said recessed helical part.

14. A tool as recited in claim 13 wherein:
said hole in the holder comprises means mounting said drill bit for rotation about its axis;
said tool comprising means for fixing said drill bit in a predetermined rotative position in which said second locating surface is positioned to engage the second peripheral side of the insert.

15. A tool as recited in claim 12 and comprising:
an opening extending into said holder from said seating surface thereon;
an opening extending through said insert from its outside to its inside surface and overlying said opening in the seating surface on said holder;
a cam pin extending through said opening in the insert and into said opening in the holder;
means in said openings mounting said cam pin for rotation between a locking position, in which said insert is fixed against movement relative to said holder and said drill bit, and an unlocking position in which said cam pin and said insert are removable from said holder;
and means on said cam pin for urging the insert's first peripheral surface toward engagement with said first locating surface and for urging the insert's second peripheral surface toward engagement with said second locating surface, in response to rotation of said cam pin to a locking position.

16. A tool as recited in claim 12 wherein:
said predetermined angle of inclination of said seating surface corresponds to the angle of the helix of said helical part.

* * * * *